United States Patent Office 3,098,086
Patented July 16, 1963

3,098,086
PROCESS FOR THE MANUFACTURE OF 11β-HYDROXY-PREGNANE COMPOUNDS
Albert Wettstein, Riehen, and Peter Wieland, Basel, Switzerland, assignors to Ciba Corporation, a corporation of Delaware
No Drawing. Filed Jan. 21, 1960, Ser. No. 3,743
Claims priority, application Switzerland Jan. 22, 1959
3 Claims. (Cl. 260—397.45)

This invention relates to 11β-hydroxy-pregnene compounds and a process for their manufacture.

In the process of the invention 21-unsubstituted 11β:17α-dihydroxy-20-oxo-pregnanes are produced from $\Delta^{17(20)}$-20-acyloxy-11-oxo-pregnenes, the process including especially the selective reduction of the 11-oxo group in 20-enol acylates of pregnane-11:20-diones. The 11β:17α-dihydroxy-20-oxo-pregnanes, especially such as possess in 3-position a free or esterified hydroxyl group, are important intermediate products for the synthesis of corticosteroids such as hydrocortisone and prednisolone and of corresponding 9α-halogen compounds and also of 16-alkylated cortico-steroids for example 16α-methyl-9α-fluoro-prednisolone or 16α- or 16β-methyl-prednisolone.

The reduction of an 11-oxo group to the 11β-hydroxyl group is an important synthetic step in the manufacture of the above specified hormones. It was hitherto carried out in such a manner that using suitable intermediate products the reactive oxo groups present, especially in 3- and/or 20-position were temporarily protected, then the 11-oxo group reduced with a complex metal hydride, for example with lithium-aluminum hydride or sodium-boron hydride and finally the protective groups removed again. For the temporary protection hitherto primarily ketals have been used, especially ethylene ketals or nitrogen derivatives, for example the semicarbazones. The introduction and removal of the protective groups always constitute additional process steps and reduce the yield of the desired end product.

The present invention is, however, based on the observation that the 11-oxo group also in a 20-enol acylate of an 11:20-dioxo-pregnane can be selectively reduced with a complex metal hydride, so that, for example, 11β:17α-dihydroxy-20-oxo-pregnanes can be prepared in an especially advantageous manner when a $\Delta^{17(20)}$-20-acyloxy-11-oxo-pregnene is treated with a complex metal hydride and the resulting corresponding 11β-hydroxyl compound reacted with an organic peracid and the resulting oxidation product hydrolyzed.

This process is of especial advantage because the conversion of a 20-ketone into the $\Delta^{17(20)}$-enol acylate not only serves for the protection of the 20-ketone during the reduction of the 11-ketone in the process, but at the same time also constitutes the first step to the introduction of the 17α-hydroxyl group. Although the 11-oxo group is known to be strongly sterically hindered, in a surprising manner the reduction takes place without noteworthy attack upon the 20-enol acylate grouping.

For the reduction in the present process are primarily concerned complex metal hydrides which do not attack the ester groupings or do so only slowly, for example sodium-boron hydride, sodium-or lithium-trialkoxy-boron hydrides such as sodium-tritertiary-butoxy-boron hydride, sodium-trimethoxy-boron hydride, lithium-tritertiary-butoxy-boron hydride or also lithium-tertiary-butoxy-aluminum hydride or lithium- or potassium-boron hydride. In the case of hydrides that attack ester groups, it is advantageous to work with less than the calculated quantity of hydride and/or at low temperatures. With the application of reducing agents of mild action, for example sodium-boron hydride, an excess of reducing agent can also be used. As solvents are used anhydrous or aqueous-organic solvents, which do not react with the reducing agent used or do so only very slowly, especially ethers, such as dialkyl ethers, for example diethyl ether, dibutyl ether, tetrahydrofuran, dioxane, glycol-dimethyl ether, glycerol-trimethyl ether, bisglycol-dimethyl ether, pyridine, the dimethyl acetal of formaldehyde, dialkyl-1:3-dioxolanes and so on.

The oxidation of the 17:20-enol double bond is carried out in the manner known per se with an organic peracid, for example with per-acetic acid, perbenzoic acid or mono perphthalic acid. It has been observed, however, that in the case of the 16α-alkyl compounds the oxidation takes place considerably more slowly than in the case of the 16-unsubstituted 20-enol acylates. The epoxides formed can be hydrolyzed both with acid and also with alkaline agents, for example with dilute sulfuric acid, with alkali metal bicarbonates, carbonates, hydroxides or alcoholates, for example with sodium methylate in absolute methanol and so on.

For the conversion of the products of the process, e.g. into the 9α-halogen-cortico-steroids mentioned hereinbefore, before (or if desired also after) introduction of the 21-acetoxy group, by bromination and replacement with potassium acetate, the 11β-hydroxyl group can be split off in the manner known per se with formation of a 9:11-double bond. The conversion of resulting $\Delta^{9(11)}$-3:17α-dihydroxy-21-acyloxy-pregnen-20-ones unsubstituted in 16-position into 9α-fluorohydrocortisone and 9α-fluoro-prednisolone is already known. The synthesis of 16α-methyl-9α-fluoro-prednisolone from the corresponding 16α-methylated intermediate product is carried out by oxidation of the 3-hydroxyl group by means of a mixture of pyridine and chromic acid and subsequent introduction of 2 double bonds in 1:2- and 4:5-position of the resulting 3-ketone by means of selenium dioxide; the conversion of the resulting $\Delta^{1:4:9}$-triene into 16α-methyl-9α-fluoro-prednisolone is known.

The enol acylates used as starting materials are prepared in the manner known per se from the 20-oxo compounds, for example from 3β-hydroxy- or 3β-acyloxy-allopregnene-11:20-dione, the 3β-hydroxy- or 3β-acyloxy-16-allopregnane-11:20-diones, especially the 3β-hydroxy- or 3β-acyloxy-16-methyl-allopregnane-11:20-diones by treatment with a carboxylic acid anhydride, especially acetic anhydride in the presence of a strong acid, for example, perchloric acid. The 16α-alkyl, especially the 16α-methyl-20-enol acylates are prepared especially advantageously by the process of U.S. patent application Serial No. 845,078, filed October 8, 1959, by Albert Wettstein et al. This process consists in that a $\Delta^{16}$-pregnane-20-one is reacted with an alkyl metal compound, especially with methyl magnesium iodide and an acylating agent reacted upon the resulting metal enolate. Starting materials especially advantageously available by this process include $\Delta^{17(20)}$-3β:20-diacyloxy- e.g. $\Delta^{17(20)}$-3β:20-diacetoxy-16α-methyl-allopregnene-11-one, $\Delta^{17(20)}$-3α:20-diacyloxy- e.g. $\Delta^{17(20)}$-3α:20-diacetoxy-16α-methyl-pregnene-11-one and $\Delta^{5,17(20)}$-diacyloxy-, e.g. $\Delta^{5,17(20)}$-3β:20-diacetoxy-16α-methylpregnadiene-11-one.

The 3:20-diacylates used as starting materials have in 3- and 20-position two identical or two different acyl groups. These are derived from aliphatic, araliphatic, aromatic and heterocyclic carboxylic acids, such as low-fatty acids, for example formic acid, acetic acid, propionic acid, butyric acid, valeric acid, caproic acid, enanthic acid, caprylic acid, phenylacetic acid, p-nitrophenyl acetic acid, benzoic acid, p-methoxy-benzoic acid, 2:4:6-tribromo-benzoic acid, furan-2-carboxylic acid and so on.

The $\Delta^{17(20)}$-11β-hydroxy-20-acyloxy-pregnenes resulting from the present process are new. There may be especially mentioned the $\Delta^{17(20)}$-11β-hydroxy-3β:20-diacyloxy-pregnenes, such as the $\Delta^{17(20)}$-11β-hydroxy-3β:20-diacetoxy-16α-methyl-allopregnene, the $\Delta^{17(20)}$-11β-hydroxy-3α:20-diacyloxy-pregnenes, such as the $\Delta^{17(20)}$-11β-hydroxy-3α:20-diacetoxy-16α-methyl-pregnene and the $\Delta^{5,17(20)}$-3β:20-diacyloxypregnadienes, such as the $\Delta^{5,17(20)}$-11β-hydroxy-3β:20-diacetoxy-16α-methyl-pregnadiene.

The following examples illustrate the invention:

Example 1

To a solution of 800 mg. of crystalline $\Delta^{17(20)}$-3β:20-diacetoxy-11-oxo-16α-methyl-allopregnene in 40 cc. of absolute tetrahydrofuran is added with stirring a solution of 35 mg. of sodium-boron hydride in 0.5 cc. of water, the container of the solution being afterwards rinsed with 10 cc. of tetrahydrofuran which is added to the mixture and the whole stirred for 8 days at room temperature. On each of the fourth and sixth days an amount of 100 mg. of sodium-boron hydride is added. The reaction mixture is then poured into 300 cc. of semi-saturated common salt solution, extracted three times with 200 cc. of ether and the ethereal solutions washed twice with 100 cc. of 6% common salt solution. A solution in 4 cc. of absolute ether of the residue from the dried and evaporated organic solutions is treated with 3 cc. of 1.4 molar mono-perphthalic acid solution in ether. 3 days later 50 cc. of ether are added, followed by extraction with 20 cc. of saturated sodium bicarbonate solution, extraction three times with 20 cc. of N-sodium hydroxide solution and three times with 20 cc. of water. The aqueous solutions are extracted by shaking twice with 50 cc. of ether, whereupon the ethereal solutions are combined, dried and evaporated. To a boiling solution of the residue in 32 cc. of methanol there is added a solution of 400 mg. of potassium carbonate in 8 cc. of water, freed from oxygen by blowing in nitrogen. After 2½ hours' boiling in the nitrogen stream under reflux, the solution is cooled, poured into 125 cc. of 6% common salt solution and extracted three times with 50 cc. of chloroform. The colorless, crystalline residue from the chloroform solutions, obtained after washing twice with 40 cc. of saturated common salt solution, drying and evaporation under vacuum, is allowed to stand overnight with 5 cc. of pyridine and 5 cc. of acetic anhydride. Evaporation is carried out in a water pump vacuum and the residue is dissolved in xylene, again evaporated in a water pump vacuum, this operation repeated once more and the product chromatographed on 24 grams of aluminum oxide (activity III). From the fractions eluted with benzene and a benzene-ethyl acetate (4:1) mixture there are obtained 370 mg. of 3β-acetoxy-11β:17α-dihydroxy-16α-methyl-20-oxo-allopregnane of M.P. 202.5–204° C. Repeated recrystallization from a methylene chloride-ether-petroleum ether mixture increases the melting point to 206.5–209.5° C. $[\alpha]_D^{27}=-9°$ (c.=1.442 in chloroform). Characteristic bands of the infra-red spectrum in methylene chloride occur at: 2.75μ+2.85μ (hydroxy); 5.77μ (acetate); 5.84μ+5.90μ (20-ketone) and 8.10μ (acetate).

To a boiling solution of 275 mg. of the triol monoacetate obtained as above in 12 cc. of methanol is added a solution of 150 mg. of potassium carbonate in 3 cc. of water, freed from oxygen by blowing in nitrogen. After boiling under reflux for 1 hour in the stream of nitrogen, the solution is poured into 50 cc. of 6% common salt solution and the whole extracted three times with 20 cc. of chloroform. The residue from the chloroform solutions after washing twice with 20 cc. of saturated common salt solution, drying and evaporating under vacuum, is repeatedly recrystallized from a chloroform-alcohol-ether mixture. The resulting 3β:11β:17α-trihydroxy-16α-methyl-20-oxo-allopregnane melts at 241.5–252° C. $[\alpha]_D^{26}=+41°$ (c.=0.8781 in absolute alcohol). Infra-red spectrum in pure liquid paraffin: characteristic bands at 2.74μ (weak) and 2.97μ (inflection at 2.92μ) (hydroxyls) and 5.90μ (ketone).

Example 2

To a solution of 4 grams of crystalline $\Delta^{17(20)}$-3β:20-diacetoxy-11-oxo-16α-methyl-allopregnene in 150 cc. of absolute tetrahydrofuran is added with stirring a solution of 500 mg. of sodium-boron hydride in 2 cc. of water, the container of this solution being rinsed out with 50 cc. of tetrahydrofuran which is added to the mixture and the whole is stirred for 9 days at room temperature. On the third day a further 500 mg. and on the fifth and eighth days further quantities of 200 mg. of sodium-boron hydride are added. Afterwards the whole is poured into 1 liter of 6% common salt solution, extracted three times with ether and the ethereal solutions washed twice with 6% common salt solution. The residue from the dried and evaporated ethereal solutions is dissolved in 25 cc. of ether and treated with 22 cc. of molar mono-perphthalic acid solution in ether. Three days later 200 cc. of ether are added followed by extraction with 100 cc. of saturated sodium bicarbonate solution, extraction three times with 80 cc. of N-sodium hydroxide solution and 3 times with 80 cc. of water. The aqueous solutions are extracted twice by shaking with 200 cc. of ether, whereupon the ethereal solutions are combined, dried and evaporated. To a boiling solution of the residue in 160 cc. of methanol is added a solution of 2 grams of potassium carbonate in 40 cc. of water, freed from oxygen by blowing in nitrogen. After 2½ hours' boiling under reflux in the stream of nitrogen, the whole is cooled, poured into 650 cc. of 6% common salt solution and the mixture extracted three times with 250 cc. of chloroform. The organic solutions are washed twice more with 200 cc. of saturated common salt solution, dried and evaporated under vacuum. By recrystallizing the crystalline residue from a methylene chloride-methanol-ether mixture, using 100 mg. of "Carboraffin," 2.26 grams are obtained of the 3β:11β:17α-trihydroxy-16α-methyl-20-oxo-allopregnane described in Example 1.

In an analogous manner there is obtained from $\Delta^{17(20)}$-3β:20-diacetoxy-11-oxo-allopregnene by sodium-boron hydride reduction the $\Delta^{17(20)}$-3β:20-diacetoxy-11β-hydroxy-allopregnene and after peracid oxidation and hydrolysis the 3β:11β:17α-trihydroxy-20-oxo-allopregnane which first partially melts at 260° C. and then decomposes at 290° C.; $[\alpha]_D=+31°$ in glacial acetic acid. Infra-red bands in pure liquid paraffin at 2.94μ (OH); 5.92μ (ketone) and 7.41μ (COCH$_3$).

What is claimed is:
1. Process for the manufacture of a member selected from the group consisting of 3-R$_1$-11β,17α-dihydroxy-16-R$_2$-20-oxo-pregnane and the 5-dehydro derivative thereof, in which R$_1$ represents a member selected from the group consisting of (1) hydroxy and (2) acyloxy in which the acyl radical is that of a lower aliphatic carboxylic acid and R$_2$ represents a member selected from the group consisting of hydrogen and a lower alkyl group, wherein a member selected from the group con- sisting of $\Delta^{17(20)}$-3-$R_3$-11-oxo-16-$R_2$-20-$R_4$-pregnene and the 5-dehydro derivative thereof, in which $R_2$ has the meaning above-given and each of $R_3$ and $R_4$ represents acyloxy in which the acyl radical is that of a lower aliphatic carboxylic acid, is treated with a complex alkali metal hydride, to form the corresponding 11β-hydroxyl compound which is then reacted with an organic peracid and the resulting 17(20)-oxido-11β-hydroxy-steroid is hydrolysed to form the 17-hydroxy-20-oxo-steroid.

2. The process of claim 1, wherein sodium boron hydride is used as the complex metal hydride.

3. The process of claim 1, wherein $\Delta^{17(20)}$-3β:20-diacetoxy-11-oxo-16α-methyl-allopregnene is used as starting material.

References Cited in the file of this patent

UNITED STATES PATENTS

| | | |
|---|---|---|
| 2,714,599 | Levin | Aug. 2, 1955 |
| 2,772,299 | Fonken | Nov. 27, 1956 |
| 2,970,157 | Cutler et al. | Jan. 31, 1961 |

OTHER REFERENCES

Oliveto et al.: Arch. Biochem. Biophys. (1954), vol. 49, pages 244–5.

Elks et al.: Journal Chemical Society, vol. 1958, pages 4001–12.